United States Patent
Carter

(10) Patent No.: US 7,003,285 B2
(45) Date of Patent: Feb. 21, 2006

(54) COMMUNICATION WITH MULTI-SENSORY DEVICES

(75) Inventor: John M. Carter, Southampton (GB)

(73) Assignee: International Business Machines Corporation, Armonk, NY (US)

(*) Notice: Subject to any disclaimer, the term of this patent is extended or adjusted under 35 U.S.C. 154(b) by 236 days.

(21) Appl. No.: 10/697,892

(22) Filed: Oct. 30, 2003

(65) Prior Publication Data

US 2005/0026599 A1 Feb. 3, 2005

(30) Foreign Application Priority Data

Jul. 31, 2003 (GB) ................................. 0317939

(51) Int. Cl.
*H04L 7/00* (2006.01)
(52) U.S. Cl. ................... 455/414.4; 455/414.1; 455/418; 455/512
(58) Field of Classification Search ............ 455/414.1, 455/414.4, 418, 420, 403, 412.1, 450, 464, 455/509, 422.1, 421, 512, 150.1, 166.2
See application file for complete search history.

(56) References Cited

U.S. PATENT DOCUMENTS

| | | | | |
|---|---|---|---|---|
| 6,167,253 A | * | 12/2000 | Farris et al. | 455/412.2 |
| 6,678,518 B1 | * | 1/2004 | Eerola | 455/422.1 |
| 6,718,178 B1 | * | 4/2004 | Sladek et al. | 455/466 |
| 6,847,823 B1 | * | 1/2005 | Lehikoinen et al. | 455/456.1 |
| 6,879,828 B1 | * | 4/2005 | Virtanen et al. | 455/426.1 |
| 2002/0019246 A1 | * | 2/2002 | Forte | 455/555 |
| 2002/0081972 A1 | | 6/2002 | Rankin | 455/41 |

* cited by examiner

*Primary Examiner*—CongVan Tran
(74) *Attorney, Agent, or Firm*—Duke W. Yee; Herman Rodriguez; Hope Shimabuku

(57) ABSTRACT

The present invention provide a method, apparatus and computer program product which enables the mode of use of a multi-sensory device to be used to prioritise the type of data which is sent to the device. The multi-sensory device sends its usage mode, for example, aural or visual, as part of communications to a server. The server then obtains the usage mode and uses this information to prioritise data sent to the device. For example if the device is being used aurally, audio data is prioritised for sending to the device such that data sent to the device is primarily or exclusively audio data.

23 Claims, 4 Drawing Sheets

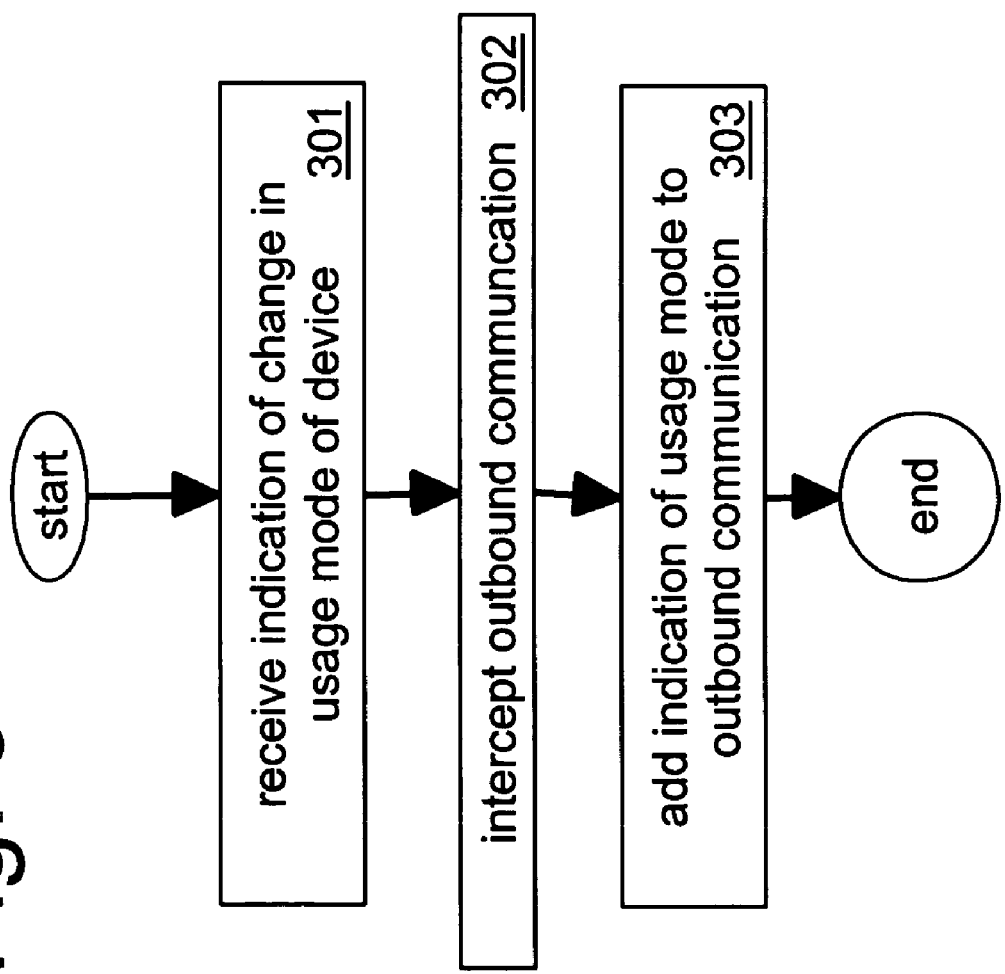

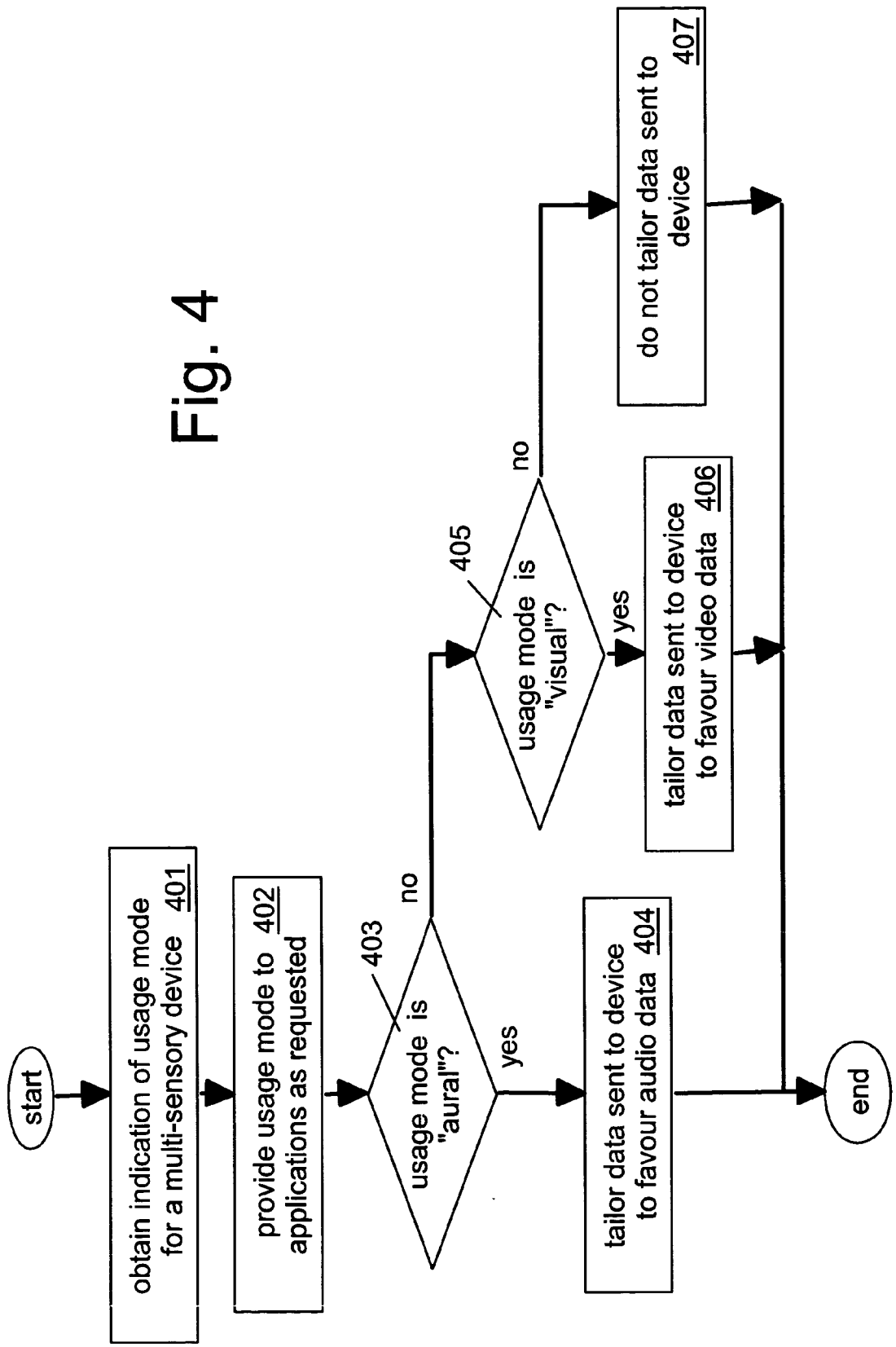

COMMUNICATION WITH MULTI-SENSORY DEVICES

FIELD OF THE INVENTION

The present invention relates to multi-sensory devices and more particularly to communication with multi-sensory devices

BACKGROUND TO THE INVENTION

The mobile telephone and/or other small portable devices (such as PDAs) are now enabled for user access to, for example, the World Wide Web, driven by the Wireless Application Protocols (WAPs). As a result there is now consumer expectation that such devices will enable access to services or applications, for example the internet, in much the same way as can be achieved with a desktop personal computer.

Further, many of these devices are multi-sensory, primarily visual and aural, through allowing input and output interaction by use of a limited viewable area and a limited keyboard or a stylus with pointing and gesture capabilities, and by use of audio techniques (voice in or out). For example, consider a mobile telephone. The user may be looking at the viewable area and controlling the device through the keys when dialling, searching the address book, interacting with text messages, playing a game, or surfing the net. Similarly, the user may be using the mouthpiece and earpiece when conducting verbal communication. Also, in either case, the other sense may be participating in a secondary manner. For example, the user may be looking at the viewable area and also hearing information by way of a connected button earpiece.

However, one difficulty associated with this type of use occurs when there are bandwidth capacity constraints for communications between a device and the server which provides the services or applications in use by the device. For example the server may have data of different types to send to the multi-sensory device which requires, for timely delivery, more bandwidth than is available on the communication channel. In this situation the server may send data to the device which, from the aspect of the user, does not make effective use of the bandwidth available, for example by sending video data when the device is only being used aurally.

Note that U.S. 2002/0081972 to Koninklijke Philips Electronics N.V. discloses adding an additional field to inquiry messages sent from a mobile device, the additional field containing personal data of a user. The personal data provides information which relates to the user, such as gender, music tastes, sports interests, etc. and these are used to decide the type of information to send to the user. However this does not address the problem of making effective use of the bandwidth available for communication with the device.

SUMMARY OF THE INVENTION

A server which is providing a services or applications to a multi-sensory device, can make better use of available bandwidth if it is able to determine how the user is using the device.

According to a first aspect the present invention provides a data processing method for a data processing host to process a usage mode indication received from a multi-sensory device, the method comprising the steps: intercepting an inbound communication from the device; obtaining a usage mode indication for the device from the communication; prioritising a plurality of data item items into a priority order according to the indicated usage mode of the device, wherein the plurality of data items were received from one or more applications for sending to the device; and sending data items to the device based on the priority order.

According to a second aspect the present invention provides a data processing apparatus for processing a usage mode indication received from a multi-sensory device, the apparatus comprising: means for intercepting an inbound communication from the device; means for obtaining a usage mode indication for the device from the communication; means for prioritising a plurality of data item items into a priority order according to the indicated usage mode of the device, wherein the plurality of data items were received from one or more applications for sending to the device; and means for sending data items to the device based on the priority order.

According to a third aspect the present invention provides a computer program product comprising instructions which, when run on a data processing host, cause said data processing host to carry out a method according to the first aspect.

Preferably the usage mode indication specifies whether the device is being used aurally or visually and the data items are characterised as audio or video. This enables the data processing host to prioritise data sent to the device such that video data is prioritised over audio data if the usage mode indication indicates that the device is being used visually, or audio data is prioritised over video data if the usage mode indication indicates that the device is being used aurally.

Alternatively the data items further have an assigned priority value, and as a result rather than allocating priority the existing priorities are increased according to the usage mode. As a result the assigned priority value for video data items is increased if the usage mode indicates that the device is being used visually and the assigned priority value for audio data items is increased if the usage mode indicates that the device is being used aurally. This enables existing priorities of data items to be reflected in the priority order which results from the usage mode indication.

In prioritising the sending of data in this way the data processing host can make more effective use of the communication bandwidth with the device. Note that prioritisation could involve sending primarily or exclusively data items which match the current usage mode of the device.

Optionally the usage mode indication is also provided to one or more applications that are communicating with the device. For example an application could register to be informed of the usage mode. Alternatively an application could request the usage mode when needed. This enables an application to tailor the service it is providing to the device according to the mode in which the device is being used.

Preferably the communication is intercepted in the communication protocol stack configured on the mobile device, for example the Wireless Access Protocol stack. In such a protocol stack the intercepting step preferably intercepts the communication in a protocol layer which implements any one of: Wireless Transaction Protocol; Transmission Control Protocol; and HyperText Transfer Protocol.

According to a fourth aspect the present invention provides a data processing method for a multi-sensory device to communicate a usage mode to a server, the method comprising the steps: receiving a usage mode indication of the multi-sensory device; intercepting an outbound communication; and adding the usage mode indication to the outbound communication.

According to a fifth aspect the present invention provide a multi-sensory device for communicating a usage mode to a server, the device comprising: means for obtaining a usage mode indication of the multi-sensory device; means for intercepting an outbound communication; and means for adding the usage mode indication to the outbound communication.

According to a sixth aspect the present invention provides a computer program product comprising instructions which, when run on a data processing host, cause said data processing host to carry out a method according to the fourth aspect.

The outbound communication will normally have been generated by an application being used by a user of the multi-sensory device, for example the application could be for a phone call, for an internet session, for doing e-mail, or for viewing information such as a video or text. However the multi-sensory device may also require to send a usage mode indication when the device is not being used for an application and so preferably the device can also generate a communication specifically for causing the usage mode to be sent.

Preferably the usage mode indication indicates whether the device is being used either aurally or visually. Optionally the usage mode indication can further indicate that the device is being used both aurally and visually.

Preferably the communication is intercepted in the communication protocol stack configured on the mobile device, for example the Wireless Access Protocol stack. In such a protocol stack the intercepting step preferably intercepts the communication in a protocol layer which implements any one of: Wireless Transaction Protocol; Transmission Control Protocol; and HyperText Transfer Protocol.

The multi-sensory device could be any device which could be used by a user to run applications which enable remote aural or visual communication, for example a mobile phone, a personal digital assistant, or a portable computer.

BRIEF DESCRIPTION OF THE DRAWINGS

The invention will now be described, by way of example only, with reference to a preferred embodiment thereof, as illustrated in the accompanying drawings, in which:

FIG. 3 is a flow diagram of the method of a multi-sensory device for sending a usage mode indication to a data processing host; and FIG. 4 is a flow diagram of a method of a data processing host when processing a usage mode indication received form a multi-sensory device.

DESCRIPTION OF THE PREFERRED EMBODIMENT

According to the preferred embodiment of the present invention a multi-sensory mobile device, such as a mobile phone or personal digital assistant (PDA), has an awareness of the mode in which it is being used (usage mode) and can convey such information to the server (data processing host) with which it is communicating. For example, for a WAP phone, the usage mode would indicate whether the phone is being used to communicate aurally (e.g: for a phone call) or visually (e.g: for viewing an internet page). Further when the usage mode changes the new type of use is conveyed to the server.

The device conveys usage information to the server as part of a header of a protocol, for example the Transmission Control Protocol (TCP) header, which the device uses to communicate with the server and not as part of application data for an application running on the device, for example by the internet browser being used. Use of a protocol header, as opposed to application data, provides the advantage that the server may use this information for a plurality of applications in communication with the device and further use of the application data would be invidious (and potentially impossible if the application data were encrypted) for the server to inspect the application data destined for the application.

Further, in the preferred embodiment the server with which the multi-sensory mobile device is in communication uses the usage mode information received from the device to decide how to most effectively communicate with that device. For example, the server may use the usage mode information to optimize its communication in terms of the priority order it uses when deciding the type of data to send to the device.

Figure 1:
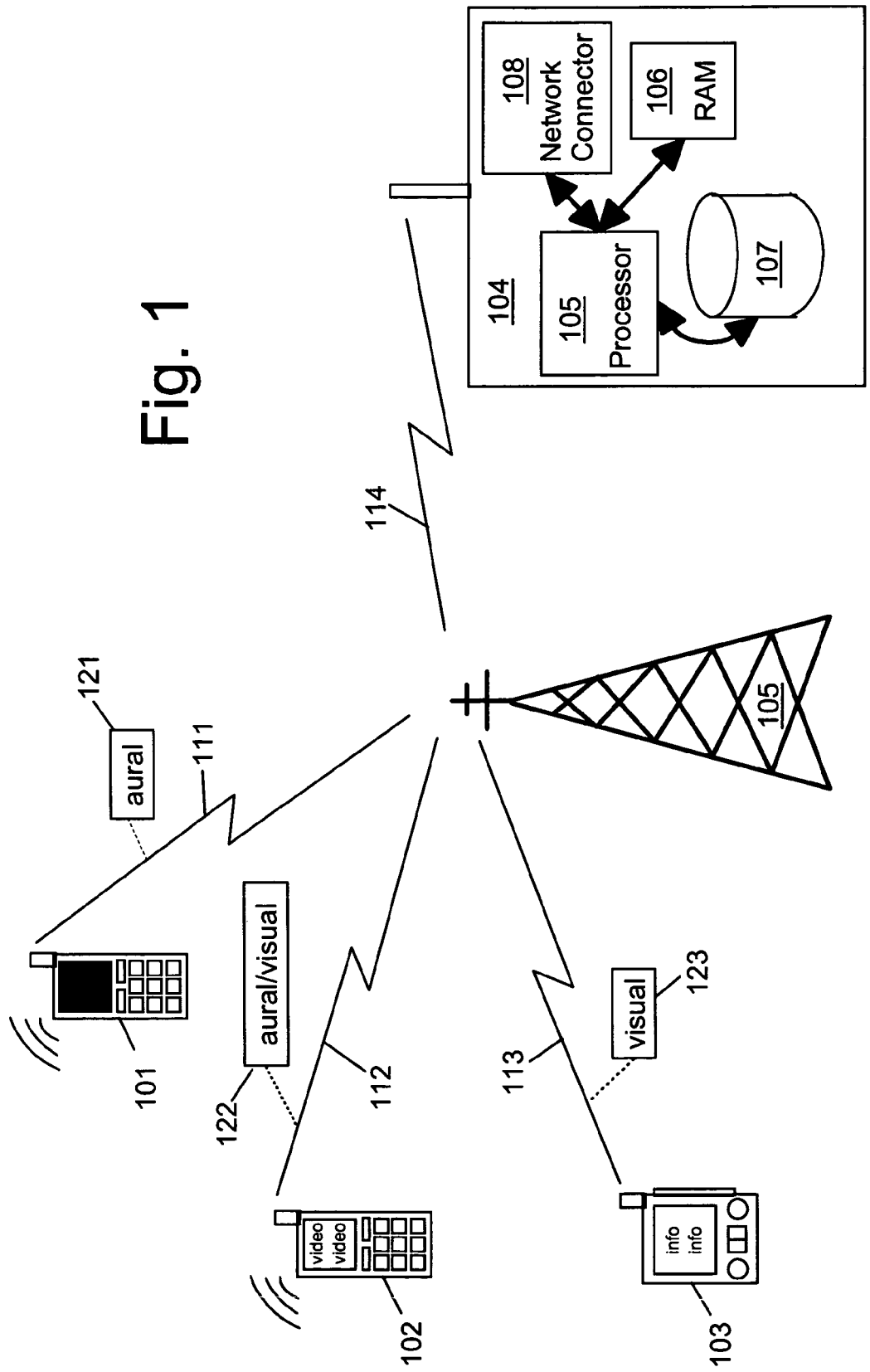
FIG. 1 which is a schematic diagram of multi-sensory devices conveying a usage mode indication to a data processing host with which they are communicating.

The preferred embodiment of the present invention is illustrated in FIG. 1 which is a schematic diagram of three mobile multi-sensory devices (101,102,103) conveying a usage mode indication (121,122,123) to a server (104) with which they are communicating. Multi-sensory device 101 is a mobile phone and is currently being used to hold a telephone conversation. As a result the device includes a usage mode indication 121 of "aural" with outbound communications 111, which in this case comprises the speech of the user, to the server 104. Multi-sensory device 102 is also a mobile phone and is currently being used to view a video with accompanying sound. As a result this device includes usage mode information 121 of "aural/visual" with outbound communications 112, which in this case comprises a request to view the video, to the server 104. Multi-sensory device 103 is a PDA and is currently being used to view information from a database which is accessible to server 104. As a result this device includes usage mode information 123 of "visual" with outbound communications 113, which in this case is comprises the requests to view records from the database.

Server 104 has a processor 105 for processing the usage mode indication received from devices 101, 102, and 103 and executing application programs that on behalf those devices, a RAM volatile memory element 106, a non-volatile memory 107, and a network connector 108 for communicating with the devices. Multi-sensory device may have similar components.

Note that server 104 is not necessarily the ultimate destination for communications received from the multi-sensory device and may require to forward communications to other servers or multi-sensory devices.

Figure 2:
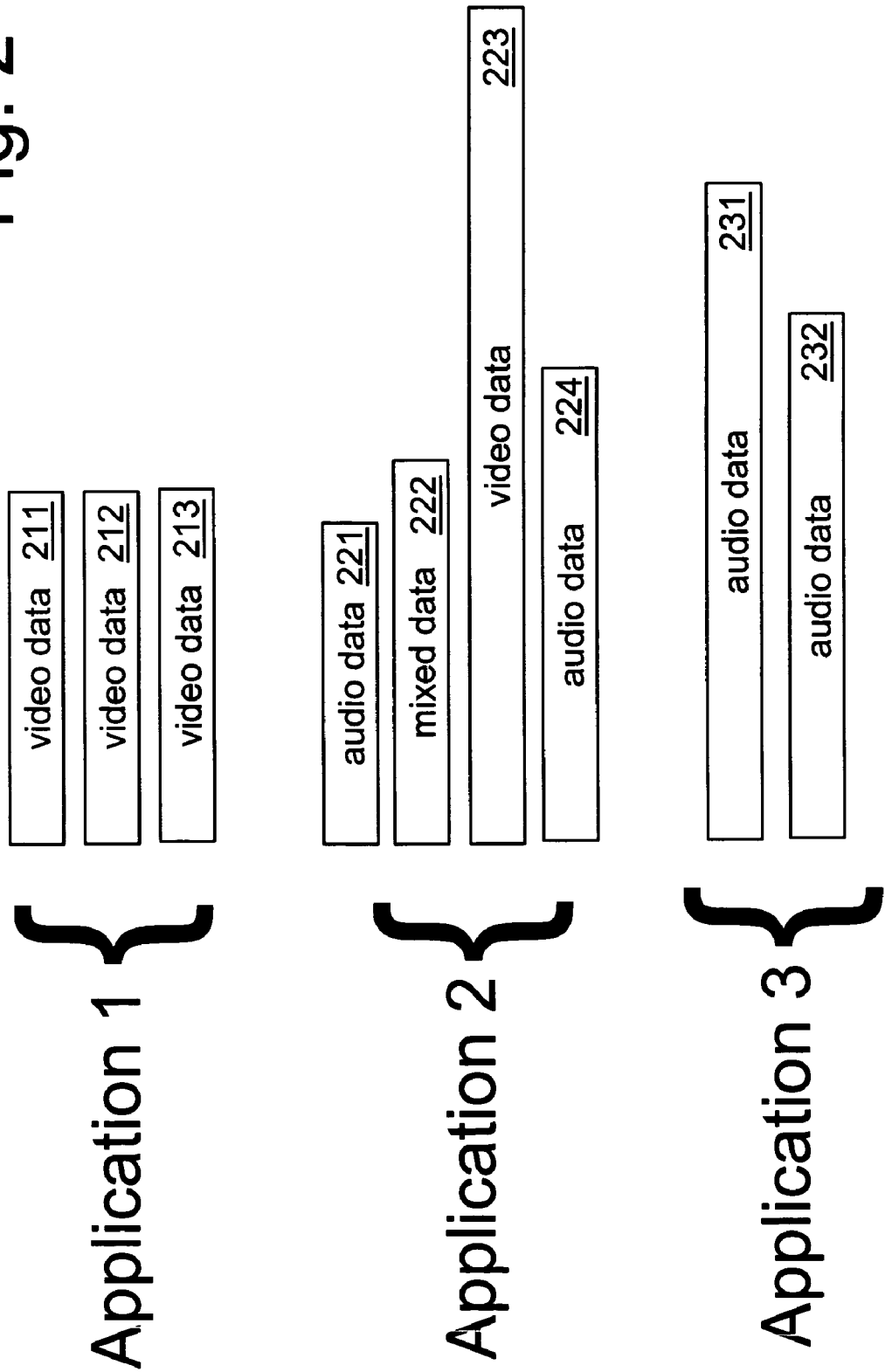
FIG. 2 is a schematic diagram of a transmission queue, for a multi-sensory device, which contains data from 3 applications which are being accessed simultaneously by the multi-sensory device.

FIG. 2 shows an example of a build up of data items in a transmission queue for a multi-sensory device, such as any one of the multi-sensory devices (101, 102, 103) of FIG. 1, if the device is running several different applications simultaneously. The transmission queue is held in the server with which the device is communicating and can build up a backlog of data items, which applications have requested to be sent to the device, when the server has more data to send to the device than can be sent to the device. For example this could happen if the communication channel between the server and the device is being used to its maximum capacity. Alternatively, for example, this situation could happen if the device stores data which it feels has not yet been "consumed" by the user, but the storage capacity of the device has been reached such that the device cannot accept further data from the server. In both cases the server builds up a backlog of data items in the transmission queue to send to the device. Note that whilst FIG. 2 shows the backlog of data items resulting from the device being used to access a plurality of applications simultaneously, it could result from a single application which sends a large amount of data.

Shown in FIG. 2 is a schematic diagram of a transmission queue, for a multi-sensory device, which contains data items from 3 applications, Application 1, 2 and 3, which are being accessed simultaneously by the device. The applications have requested the server to send the various data items to the device. Application 1 is a video application and has requested that visual data items (211, 212, 213) be sent to the device. For example, Application 1 could be providing a clock which sends time data in the form of an analogue clock which is displayed in a window in some part of the screen of the device and is accessed at regular intervals. Application 2 is an audio/video application which has requested that different sorts of data items be sent to the device. These data items are audio data items (221,224), mixed audio and video data items (222) and video data items (223). For example, application 2 could be providing an audio/visual presentation with a mixture of silent images, movie clips (images with sound), and audio which provides background information about silent images and/or video clips. For example the clock of application 1 could overlay Application 2 or be hidden by Application 2. Application 3 is an audio application and has requested just audio data items (231, 232) be sent to the device. For example application 3 could be a normal telephone conversation, a talking newspaper service, or a talking advertisement service.

Note that, in FIG. 2, the applications and the associated data items which they have requested be sent to the device are just examples. In practice the device may be running one or more applications, and an application may send one or more data items.

Further note that the application data held in a transmission queue does not necessarily originate from applications running on the same server as the server on which the transmission queue is held. For example the server could be acting as a gateway between the multi-sensory device and an application.

According to the preferred embodiment of the present invention the server receives an indication of the usage mode of a device and processes the transmission queue for the device, such as shown in FIG. 2, according to this usage mode.

FIG. 3 is a flow diagram of the method of a multi-sensory device for sending usage mode information to the server, according to the preferred embodiment of the present invention. At step 301 an indication of the usage mode is received from another component of the multi-sensory device. At step 302 an outbound communication of application data is intercepted. For example this can be done at various levels in a WAP stack, for example depending on the implementation of the WAP stack, at the Wireless Transaction Protocol (WTP), Transmission Control Protocol (TCP), or HyperText Transfer Protocol (HTTP) layer. Finally at step 303 an indication of the usage mode is added to an appropriate protocol header of the communication, for example the header associated with the protocol layer at which the communication was intercepted.

Note that the method of FIG. 3 could be carried out each time the usage mode changes, or at regular time intervals or with every outbound communication even when the usage mode does not change. Further note that if the usage mode changes and there is no outbound communication to intercept the multi-sensory device may generate an outbound communication with no application data in order to ensure that the usage mode data is conveyed to the server. This would then enable a server, for example, not to send video data to the device if the usage mode has been changed to "aural" by the user as a result of putting the device into a place where the viewable screen cannot be seen.

Further note that there are several methods which could be employed to discover the usage mode of a multi-sensory device but these are not part of the present invention. Preferably the multi-sensory device detects this automatically by analysing the current usage pattern of the device. For example if the microphone (as opposed to the speaker) is in frequent use, it is reasonably assumed that the mode of use is aural, and similarly if the keypad is in frequent use when running an internet application, it is reasonably assumed that the mode of use is visual.

Alternatively, for example, the multi-sensory device could include a special button on the device which the user sets to indicate the usage mode or the user could set the mode by using existing buttons in a particular sequence. Alternatively the usage mode could be selectable by the user in a software package installed on the device.

In another alternative the multi-sensory device could include an orientation detection mechanism (e.g. a three dimensional mercury switch or equivalent). This would use the orientation of the device to select a usage mode. For example, using a mobile telephone in voice mode is likely to imply a predominantly vertical orientation of the axis of the device, whereas using it in a visual mode is likely to imply a predominantly horizontal orientation of the device. However, such an implementation is likely to provide unreliable results.

FIG. 4 is a flow diagram of a method of a server when processing a usage mode indication received from a multi-sensory device, according to the preferred embodiment of the present invention. At step 401 the server intercepts an inbound communication from a multi-sensory device, and obtains a usage mode indication from a protocol header associated with the communication. For example the communication is intercepted in a layer of the WAP stack and the layer will depend on the layer in which the usage mode indication was added by the multi-sensory device at step 303 of FIG. 3. Further, note that this communication could involve transmission of application data from the device to the server, for example voice data as part of a telephone conversation or a request for a service, or could be a communication to specifically pass the usage mode data to the server (i.e.: a communication with no application data).

At step 402 the usage mode is provided to any applications which have requested to be made aware of it. For example, a clock program, such as application 1 of FIG. 2, could wish to know the usage mode if it provides an alarm function and depending on the usage mode of the device it sends a visual or audible alarm.

At step 403 a check is made to see if the usage mode received from the multi-sensory device indicates "aural", and if it does at step 404 the server tailors data sent to the device to favour audio data. For example, with reference to FIG. 2, the server could assign a higher sending priority to data from Application 3 and Application 2, compared to data from Application 1 which comprises only video data items (211,212,213). Further data from Application 3 which comprises purely audio data items (231, 232) may be given a higher sending priority than data from Application 2 which comprises audio data items (221,224), video data items (223) and mixed data items (222). Further with regards to the application data from Application 2, the audio data items (221, 224) may be given a higher sending priority than the mixed data items (222), and the mixed data items (222) may be given a higher sending priority than the video data items (223). Note that assigning data item a higher sending priority results in it being preferred for sending to the mobile device compared to lower priority data, thus setting a priority order.

If the usage mode does not indicate "aural", at step 405 a check is made to see if the usage mode indicates "visual", and if it does at step 406 the server tailors data sent to the device to favour video data. For example with reference to FIG. 2 the server can give a higher sending priority to video data items from applications, such as Applications 1 and 2, and further give a higher sending priority to video data items from applications which send only video data, such as Application 1. Further, for a given application, such as Application 2, the video data item (223) may be given a higher sending priority than the mixed data item (222), and mixed data item (222) may be given a higher sending priority than audio data item (221, 224).

If the usage mode does not indicate "aural" or "visual", at step 407, the server makes no attempt to tailor the data sent to the multi-sensory device and so it may be sent, for example, on a First In First Out (FIFO) basis.

Optionally each application may assign a sending priority value to its data items so that higher priority data value items are sent before lower priority value data items. In this case, optionally, at steps 404 and 406, the server can factor the application assigned sending priority values into deciding which application data items are sent first. As a result rather than assigning levels of sending priority to data items, the existing priority value is modified by differing amounts according to the type of the data item and the usage mode of the multi-sensory device to which the data is to be sent. For example if the usage mode indicated "visual" the sending priority value assigned to video data is increased by amount X, and the sending priority value assigned to mixed data is increased by amount Y, where X is greater than Y. This allows, for example, for the mixed data item (222) from Application 2 to have a higher sending priority than the video data items (211,212,213) from Application 1, even though the usage mode is "visual". This would happen if the difference in the application assigned sending priority values is greater than X-Y. Further in such a scenario, audio data could be assigned a priority value of 0 to ensure that it is never sent before mixed or audio data when the usage mode is "visual".

Note that making the usage mode available to applications at step 402 is optional. Further, as an alternative to step 402, the usage mode is provided to applications on request.

Further note that a skilled person would realise that the usage mode indication could take many forms, the only requirement being that it is recognisable to the server which processes it. For example it could be a text string or a numeric value.

Note that a skilled person in the art would realise that the method described with reference to FIGS. 3 and 4 could be implemented in a variety of programming languages, for example, Java™, C, and C++ (Java is a registered trademark of Sun Microsystems, Inc. in the United States, other countries, or both.). Further a skilled person would realise that once implemented the methods can be stored in a computer program product comprising one or more programs, in source or executable form, on a media, such as floppy disk, CD, and DVD, suitable for loading onto a data processing host and causing the data processing host to carry out the methods. Further a skilled person would realise that the methods described with reference to FIGS. 3 and 4 could be embodied in a data processing apparatus.

Thus the present invention provides a method, apparatus and computer program product which enables the mode of use of a multi-sensory device to be used to prioritise the type of data which is sent to the device. The multi-sensory device sends its usage mode, for example, "aural" or "visual", as part of communications to a server. The server then obtains the usage mode and uses this information to prioritise data sent to the device. For example if the device is being used aurally, audio data is prioritised for sending to the device such that data sent to the device is primarily or exclusively audio data.

The invention claimed is:

1. A data processing method for a data processing host to process a usage mode indication received from a multi-sensory device, the method comprising the steps:
   intercepting an inbound communication from the device;
   obtaining a usage mode indication for the device from the communication;
   prioritising a plurality of data items into a priority order according to the usage mode indication for the device, wherein the plurality of data items are received from one or more applications for sending to the device; and
   sending data items to the device based on the priority order.

2. The method of claim 1 wherein the usage mode indication specifies whether the device is being used aurally or visually and data items are characterised as either audio or video, and the prioritising step comprises the steps:
   allocating video data items higher priority than audio data items if the usage mode indicates that the device is being used visually; and
   allocating audio data items higher priority than video data items if the usage mode indicates that the device is being used aurally.

3. The method of claim 1 wherein the usage mode indication specifies whether the device is being used aurally or visually and the data items are characterised as either audio or video and have an assigned priority value, and the prioritising step comprises the steps:
   increasing the assigned priority value for video data items if the usage mode indicates that the device is being used visually; and
   increasing the assigned priority value far audio data items if the usage mode indicates that the device is being used aurally.

4. The method of claim 1 wherein the prioritising step prioritises data items such that the sending step sends exclusively data items suitable for the indicated usage mode of the device.

5. The method of claim 1 comprising the further step of:
   providing the wage node indication to one or more applications.

6. The method of claim 1 wherein the intercepting step intercepts a communication in a protocol layer which implements any one of: Wireless Truncation Protocol; Transmission Control Protocol; and HyperText Transfer Protocol.

7. A data processing method for a multi-sensory device to communicate a usage mode to a server, the method comprising the steps:
   receiving a usage mode indication of the multi-sensory device;
   intercepting an outbound communication; and adding the usage mode indication to the outbound communication wherein the usage mode indication indicates that the device is being used either aurally or visually.

8. A data processing apparatus for processing a usage mode indication received from a multisensory device, the apparatus comprising:
   means for intercepting an inbound communication from the device;
   means for obtaining a usage mode indication for the device from the communication;
   means for prioritising a plurality of data items into a priority order according to the usage mode indication for the device, wherein the plurality of data items are received from one or more applications for sending to the device; and
   means for sending data items to the device based on the priority order.

9. The apparatus of claim 8 wherein the usage mode indication specifies whether the device is being used aurally or visually and data items are characterised as either audio or video, and the prioritising means comprises:
   means for allocating video data items higher priority than audio data items if the usage mode indicates that the device is being used visually; and
   means for allocating audio data items higher priority 10 than video data items if the usage mode indicates that the device is being used aurally.

10. The apparatus of claim 8 wherein the usage mode indication specifies whether the device is being used aurally or visually and the data items are characterised as either audio or video and have an assigned priority value, and the prioritising means comprises:
   means for increasing the assigned priority value for video data items if the usage mode indicates that the device is being used visually; and
   means for increasing the assigned priority value for audio data items if the usage mode indicates that the device is being used aurally.

11. The apparatus of claim 8 wherein the prioritising means prioritises data items such that the sending means sends exclusively data items suitable for the indicated usage mode of the device.

12. The apparatus of claim 8 further comprising:
   means for providing the usage mode indication to one or more applications.

13. A multi-sensory device for communicating a usage mode to a server, the device comprising:
   means for obtaining a usage mode indication of the multi-sensory device;
   means for intercepting an outbound communication; and
   means for adding the usage mode indication to the outbound communication wherein the usage mode indication indicates that the device is being used either aurally or visually.

14. A computer program product comprising instructions which, when run on a data processing host, cause said data processing host to carry out a method comprising the steps:
   intercepting an inbound communication from the device;
   obtaining a usage mode indication for the device from the communication;
   prioritising a plurality of data items into a priority order according to the usage mode indication for the device, wherein the plurality of data items are received from one or more applications for sending to the device; and
   sending data items to the device based on the priority order.

15. A computer program product according to claim 14 wherein the usage mode indication specifies whether the device is being used aurally or visually and data items are characterised as either audio or video, and the prioritising step comprises the steps:
   allocating video data items higher priority than audio data items if the usage mode indicates that the device is being used visually; and
   allocating audio data items higher priority than video data items if the usage mode indicates that the device is being used aurally.

16. A computer program product according to claim 14 wherein the usage mode indication specifies whether the device is being used aurally or visually and the data items are characterised as either audio or video and have an assigned priority value, and the prioritising step comprises the steps:
   increasing the assigned priority value for video data items if the usage mode indicates that the device is being used visually; and
   increasing the assigned priority value for audio data items if the usage mode indicates that the device is being used aurally.

17. A computer program product according to claim 14 wherein the prioritising step prioritises data items such that the sending step sends exclusively data items suitable for the indicated usage mode of the device.

18. A computer program product according to claim 14 the method comprising the further stop of:
   providing the usage mode indication to one or more applications.

19. A computer program product according to claim 14 wherein the intercepting step intercepts a communication in a protocol layer witch implements any one of: Wireless Truncation Protocol; Transmission Control Protocol; and 10 HyperText Transfer Protocol.

20. A computer program product comprising instructions which, when run on a data processing host, cause said data processing host to carry out a method comprising the steps:
   receiving a usage mode indication of the multi-sensory device;
   intercepting an outbound communication; and
   adding the usage mode indication to the outbound communication wherein the usage mode indication indicates that the device is being used either aurally or visually.

21. A method for communicating between a data processing host and a multi-sensory device, said method comprising:
   receiving, at the data processing host, an inbound communication from to multi-sensory device;
   reading at the data processing host, a usage mode indication sent with the communication;
   processing, using to data processing host, the usage mode indication;
   prioritizing, at to data processing host, a plurality of data items into a priority order according to the usage mode indication; and
   sending, from the data processing host, the data items to the multi-sensory device in an order corresponding to the priority order.

22. The method of claim 21 wherein the step of processing the usage mode indication comprises:
   identifying the usage mode indication;
   categorizing the usage mode indication as aural or visual; and
   tailoring the data items sent to the multi-sensory device according to the usage mode indication.

23. The method of claim 21 wherein the step of reading the usage mode indication is performed in a protocol header.

* * * * *